United States Patent
Tan et al.

(10) Patent No.: US 12,461,687 B2
(45) Date of Patent: Nov. 4, 2025

(54) MEMORY SYSTEMS AND OPERATION METHODS THEREOF, MEMORY CONTROLLERS AND MEMORIES

(71) Applicant: Yangtze Memory Technologies Co., Ltd., Hubei (CN)

(72) Inventors: Hua Tan, Hubei (CN); Yufei Feng, Hubei (CN)

(73) Assignee: Yangtze Memory Technologies Co., Ltd.

( * ) Notice: Subject to any disclaimer, the term of this patent is extended or adjusted under 35 U.S.C. 154(b) by 0 days.

(21) Appl. No.: 18/323,948

(22) Filed: May 25, 2023

(65) Prior Publication Data

US 2024/0126478 A1     Apr. 18, 2024

Related U.S. Application Data

(63) Continuation of application No. PCT/CN2023/071798, filed on Jan. 11, 2023.

(30) Foreign Application Priority Data

Oct. 18, 2022   (CN) .......................... 202211275605.2

(51) Int. Cl.
G06F 3/06        (2006.01)

(52) U.S. Cl.
CPC ............ G06F 3/0659 (2013.01); G06F 3/065 (2013.01); G06F 3/0658 (2013.01); G06F 3/0604 (2013.01); G06F 3/0679 (2013.01)

(58) Field of Classification Search
CPC ...... G05B 13/00–048; G05B 15/00–02; G05B 17/00–02; G06F 1/00–3296;

(Continued)

(56) References Cited

U.S. PATENT DOCUMENTS 4,380,029 A *  4/1983  Bode ................. G11B 20/1252
6,282,121 B1 *  8/2001  Cho .................... G11C 16/3459
                                                            365/201

(Continued)

FOREIGN PATENT DOCUMENTS

CN         111755056 A      10/2020
CN         111863074 A      10/2020

(Continued)

OTHER PUBLICATIONS

Nicolas Bailon, Daniel, Johann-Philipp Thiers, and Jürgen Freudenberger. May 16, 2022. "Error Correction for TLC and QLC NAND Flash Memories Using Cell-Wise Encoding" Electronics 11, No. 10: 1585. https://doi.org/10.3390/electronics11101585 (Year: 2022).*

(Continued)

Primary Examiner — Daniel C. Chappell
(74) Attorney, Agent, or Firm — Hanley, Flight & Zimmerman, LLC

(57) ABSTRACT

Embodiments of the present disclosure disclose a memory system and operation method thereof, a memory controller and a memory. The memory system includes a memory. The memory includes a memory cell array and a peripheral circuit coupled to the memory cell array. The memory cell array includes memory cells capable of storing m bits of information, and m is a positive integer greater than 1. The operation method includes: determining, by the peripheral circuit, (n+1)th group of page data according to a received prefix command and received n groups of page data, wherein n is a positive integer, and n+1 is a positive integer less than or equal to m; and writing the n groups of page data and the (n+1)th group of page data into the memory cell array to generate $2^n$ different data states in the memory cell array.

20 Claims, 9 Drawing Sheets

(58) Field of Classification Search
CPC .............. G06F 3/00; G06F 3/06–0689; G06F
5/00–16; G06F 8/00–78; G06F 9/00–548;
G06F 11/00–3696; G06F 12/00–16; G06F
13/00–4295; G06F 15/00–825; G06F
16/00–986; G06F 18/00–41; G06F
17/00–40; G06F 21/00–88; G06F
2009/3883; G06F 2009/45562–45595;
G06F 2015/761–768; G06F 2201/00–885;
G06F 2206/00–20; G06F 2209/00–549;
G06F 2211/00–902; G06F 2212/00–7211;
G06F 2213/00–4004; G06F 2216/00–17;
G06F 2221/00–2153; G06N 3/00–126;
G06N 5/00–048; G06N 7/00–08; G06N
10/00; G06N 20/00–20; G06N
99/00–007; G06T 1/00–60; G06V
30/00–43; G11B 20/00–24; G11B
33/00–1493; G11C 11/00–5692; G11C
13/00–06; G11C 14/00–009; G11C
15/00–06; G11C 16/00–3495; G11C
17/00–18; G11C 2207/00–229; G11C
2216/00–30; H01L 25/00–50; H01L
2225/00–1094; H03M 7/00–707; H04L
9/00–38; H04L 12/00–66; H04L
41/00–5096; H04L 49/00–9094; H04L
61/00–59; H04L 67/00–75
See application file for complete search history.

(56) References Cited

U.S. PATENT DOCUMENTS

| | | | | |
|---|---|---|---|---|
| 6,836,432 B1* | 12/2004 | Parker | ................ | G11C 11/5628 |
| | | | | 365/185.12 |
| 6,988,175 B2* | 1/2006 | Lasser | .................. | G11C 16/34 |
| | | | | 365/228 |
| 7,193,896 B2* | 3/2007 | Shiga | ................. | G11C 11/5642 |
| | | | | 365/185.11 |
| 7,345,928 B2* | 3/2008 | Li | ....................... | G11C 11/5628 |
| | | | | 365/185.21 |
| 7,586,784 B2* | 9/2009 | Roohparvar | ....... | G11C 16/0483 |
| | | | | 365/185.12 |
| 8,134,872 B2* | 3/2012 | Roohparvar | ....... | G11C 16/0483 |
| | | | | 365/201 |
| 8,693,251 B2* | 4/2014 | Roohparvar | ....... | G11C 11/5628 |
| | | | | 365/185.12 |
| 10,748,619 B1 | 8/2020 | Li | | |
| 2007/0288702 A1* | 12/2007 | Roohparvar | ....... | G11C 16/0483 |
| | | | | 711/154 |
| 2008/0049496 A1* | 2/2008 | Abraham | ............ | G06F 12/0246 |
| | | | | 365/185.11 |
| 2009/0327594 A1* | 12/2009 | Roohparvar | ....... | G11C 16/3454 |
| | | | | 365/185.12 |
| 2019/0042130 A1 | 2/2019 | Prabhu et al. | | |
| 2019/0096449 A1* | 3/2019 | Kim | ...................... | G11C 7/106 |
| 2019/0164612 A1 | 5/2019 | Solanki et al. | | |
| 2019/0227751 A1 | 7/2019 | Khakifirooz et al. | | |
| 2020/0319953 A1* | 10/2020 | Kim | ...................... | G06F 11/0757 |
| 2021/0391026 A1* | 12/2021 | Choi | ...................... | G11C 16/10 |
| 2023/0223078 A1* | 7/2023 | Wan | .................... | G11C 16/0483 |
| | | | | 365/185.03 |
| 2023/0223085 A1* | 7/2023 | Wan | ....................... | G11C 16/10 |
| | | | | 365/189.011 |

FOREIGN PATENT DOCUMENTS

| | | |
|---|---|---|
| CN | 114530181 A | 5/2022 |
| CN | 115527587 A | 12/2022 |

OTHER PUBLICATIONS

How does QLC SSD work ?; Robert Meservy; Quora; Aug. 15, 2020; retrieved from https://www.quora.com/How-does-QLC-SSD-work/answer/Robert-Meservy/log (Year: 2020).*

S. Yin, T. Lu, Z. Xie, L. Liu and S. Wei, "Bit-Level Disturbance-Aware Memory Partitioning for Parallel Data Access for MLC STT-RAM," in IEEE Transactions on Very Large Scale Integration (VLSI) Systems, vol. 26, No. 11, pp. 2345-2357, Nov. 2018, doi: 10.1109/TVLSI.2018.2862388 (Year: 2018).*

Y. Cai, E. F. Haratsch, O. Mutlu and K. Mai, "Error patterns in MLC NAND flash memory: Measurement, characterization, and analysis," 2012 Design, Automation & Test in Europe Conference & Exhibition (DATE), Dresden, Germany, 2012, pp. 521-526, doi: 10.1109/DATE.2012.6176524. (Year: 2012).*

Korean Intellectual Property Office, "Notice of Submission of Opinions," issued in connection with Korean Patent Application No. 10-2024-7027592, mailed on Apr. 21, 2025, 6 pages. [English language machine translation included.].

International Searching Authority, "International Search Report," issued in connection with International Patent Application No. PCT/CN2023/071798, mailed on Jun. 28, 2023, 6 pages. [English language machine translation included.].

International Searching Authority, "Written Opinion of the International Searching Authority," issued in connection with International Patent Application No. PCT/CN2023/071798, mailed on Jun. 28, 2023, 8 pages. [English language machine translation included.].

Taiwan Intellectual Property Office, "Notice of Examination Opinion," issued in connection with Taiwan Patent Application No. 114117289, mailed on Aug. 29, 2025, 14 pages. [English language machine translation included.].

Japanese Patent Office, "Notice of Refusal," issued in connection with Japanese Patent Application No. 2024-549695, mailed on Sep. 2, 2025, 10 pages. [English language machine translation included.].

* cited by examiner

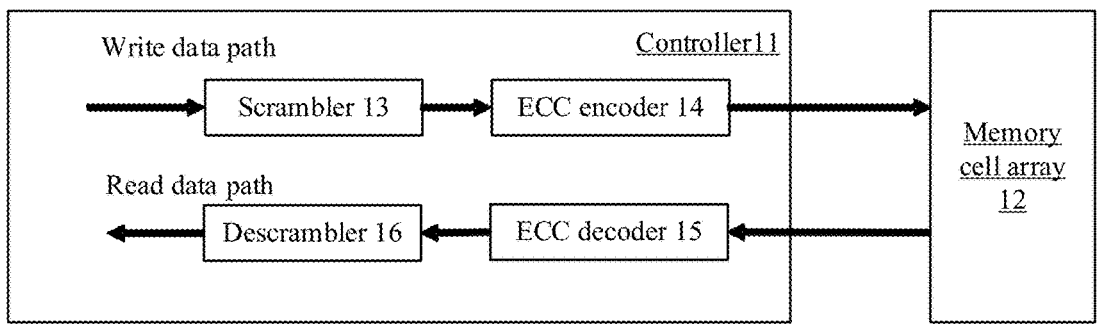

Fig. 3

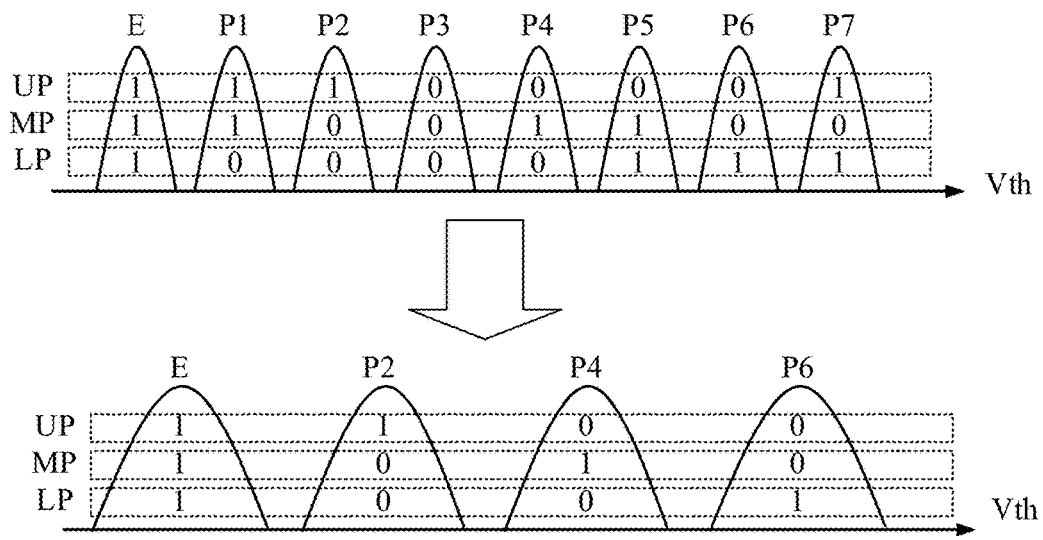

Fig. 4

Determining, by the peripheral circuit, the (n+1)th group of page data according to received prefix command and received n groups of page data, where n is a positive integer, and n+1 is a positive integer less than or equal to m — S201

Writing n groups of page data and (n+1)th group of page data into the memory cell array, so as to generate $2^n$ different data states in the memory cell array — S202

Fig. 5

MEMORY SYSTEMS AND OPERATION METHODS THEREOF, MEMORY CONTROLLERS AND MEMORIES

CROSS-REFERENCE TO RELATED APPLICATION(S)

This patent arises from a U.S. patent application that is a continuation of and claims the benefit of International Application No. PCT/CN2023/071798, filed on Jan. 11, 2023, which claims priority to Chinese patent application No. 202211275605.2, entitled "Memory System and Operation Method Thereof, Memory Controller and Memory" filed on Oct. 18, 2022. International Application No. PCT/CN2023/071798 and Chinese patent application No. 202211275605.2 are herein incorporated by reference in their entireties.

TECHNICAL FIELD

Examples of the present disclosure relate to, but are not limited to, the field of semiconductors, and in particular, to memory systems and operation methods thereof, memory controllers, and memories.

BACKGROUND

Memory cells of a NAND memory include single-level cells storing 1 bit of data and multi-level cells storing at least 2 bits of data. The NAND memory with single-level cells can achieve faster writing speed and higher reliability, but its storage capacity is small, and the cost is high. The NAND memory with multi-level cells has larger storage capacity and lower cost but is slower in writing speed and lower in reliability.

BRIEF DESCRIPTION OF THE DRAWINGS

In order to more clearly illustrate the detailed description of the present disclosure or the technical solutions, the drawings that need to be used in the description of the detailed description will be briefly introduced below. It is apparent that the accompanying drawings in the following description are some example implementations of the present disclosure, and other examples will be understood to those having ordinary skill in the art.

FIG. 3 is a schematic diagram for a memory system illustrated according to an example;

FIG. 4 is a schematic diagram for a writing state of a memory illustrated according to an example;

FIG. 5 is a flow chart for an operation method of a memory system illustrated according to an example of the present disclosure;

DETAILED DESCRIPTION

Figure 1:
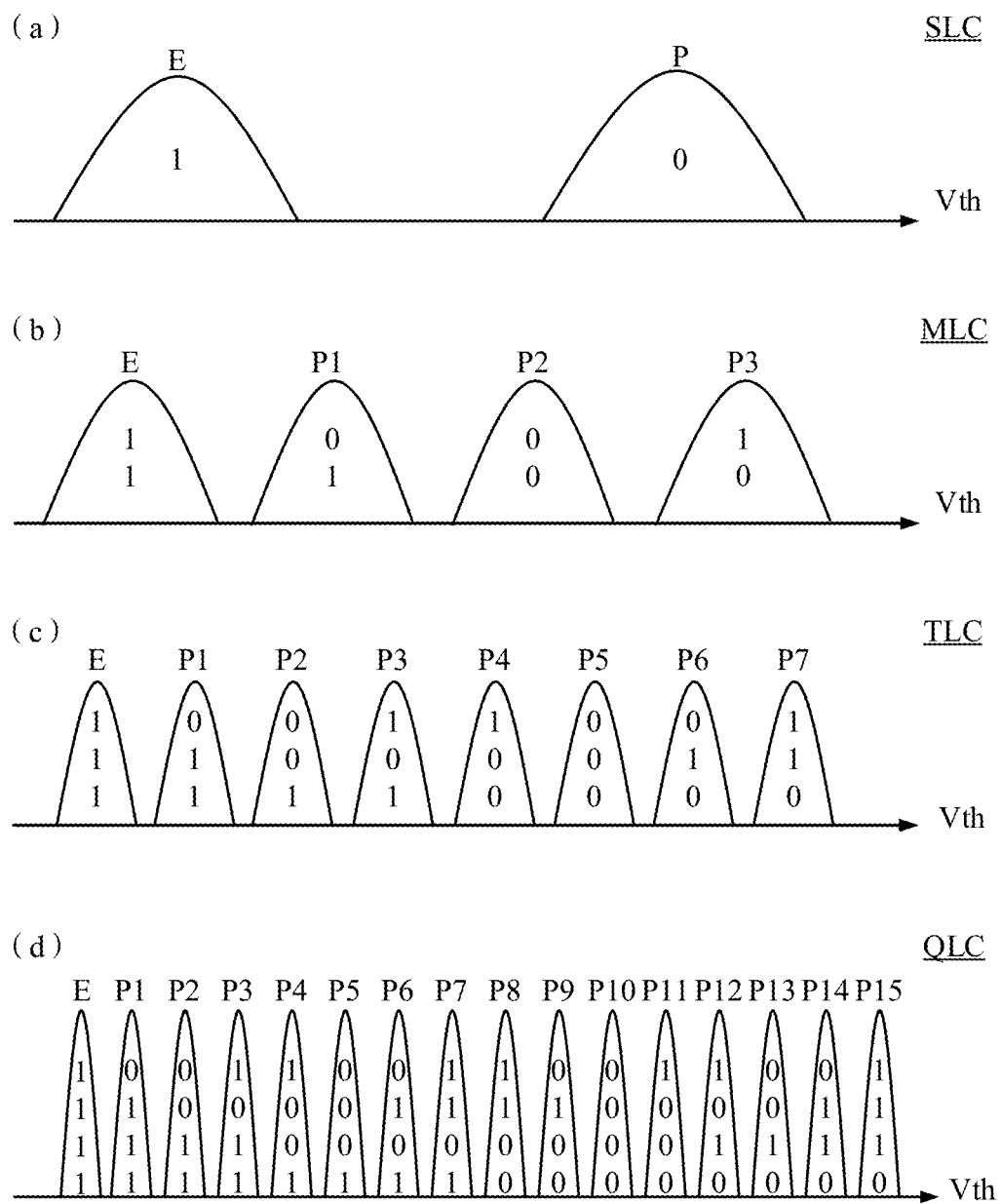
FIG. 1 is a schematic diagram for different data states of a memory illustrated according to an example.

NAND memory is required to achieve not only fast writing speed and high reliability of single-level cells, but also large storage capacity and low cost of multi-level cells, in some applications. Therefore, flexibly configuring the NAND memory to realize multiple modes of memory cells becomes an urgent technical problem to be solved.

The following examples are provided for a better understanding of the present disclosure, and are not limited to the best implementation mode, and do not limit the content and protection scope of the present disclosure. Any product identical or similar to the present disclosure obtained under the teachings of the present disclosure or by combining the disclosure with features of other prior art falls within the protection scope of the present disclosure.

It is noted that, in the description of the present disclosure, the orientational or positional relationships indicated by the terms such as "upper", "lower", "inner", "outer", etc., are based on the orientational or positional relationships shown in the drawings, and are only for convenience of describing the present disclosure and simplifying the description, but does not indicate or imply that the referred device or element must have a specific orientation, be constructed and operate in a specific orientation, and thus shall not be construed as limiting the present disclosure. In addition, the terms such as "first" and "second" are used for descriptive purposes only, and shall not be understood as indicating or implying relative importance.

FIG. 1 is a schematic diagram illustrating different data states of a memory according to an example. Referring to FIG. 1, with the development of NAND memory, the number of bits of a memory cell has increased from 1 bit to 2 bits, 3 bits, and 4 bits, and accordingly, memory cell has evolved from a Single Level Cell (SLC) into a Multiple Level Cell (MLC), a Triple Level Cell (TLC), a Quad-Level Cell (QLC). Correspondingly, the number of data states in the memory is increased from 2 to 4, 8, and 16, such that the capacity of the memory is increased and the cost is reduced.

Referring to FIG. 1(*a*), the memory cell of the SLC memory stores 1 bit of data. The data state of the SLC memory includes one erased state and one programmed state. Its erased state is marked as E, and its programmed state is marked as P. The threshold voltage of the programmed state P is greater than that of the erased state E.

Referring to FIG. 1(*b*), the memory cell of the MLC memory stores 2 bits of data. The data state of the MLC memory includes one erased state and three programmed states. Its erased state is marked as E, and its programmed states are marked as P1, P2 and P3 from the first state to the third state in sequence. The threshold voltages gradually increase from the P1 state to the P3 state.

Referring to FIG. 1(c), the memory cell of the TLC memory stores 3 bits of data. The data state of the TLC memory includes one erased state and seven programmed states. Its erased state is marked as E, and its programmed states are marked as P1, P2, P3, P4, P5, P6 and P7 from the first state to the seventh state in sequence. The threshold voltages gradually increase from the P1 state to the P7 state.

Referring to FIG. 1(d), the memory cell of the QLC memory stores 4 bits of data. The data state of the QLC memory includes one erased state and fifteen programmed states. Its erased state is marked as E, and its programmed states are marked as P1, P2, P3, P4, P5, P6, P7, P8, P9, P10, P11, P12, P13, P14 and P15 from the first state to the 15th state in sequence. The threshold voltages gradually increase from the P1 state to the P15 state.

With the development of 3D NAND technology, the number of stacked layers in memory keeps increasing. When the number of stacked layers is greater than or equal to 64, there will be no MLC memory. Although the current main 3D NAND product is TLC memory, the main 3D NAND product will be QLC memory when the number of stacked layers is greater than or equal to 300.

Nodes of new 3D NAND technology are costly to develop, especially when stacked layers are increasingly growing. From the perspective of customer demand, low-bit memory is still required to meet the requirements of better reliability, for example, in the automotive industry. However, this market size may not be large. From the perspective of cost, it may not be worthwhile to develop dedicated low-bit memory. For example, when the mainstream NAND is TLC memory, there are still some application needs for MLC memory. When the mainstream NAND is QLC memory, there are still some application needs for TLC memory and MLC memory. From the perspective of an application program, this is a mismatch.

One solution is to develop general-purpose NAND memory, which supports all levels of cells (SLC/MLC/TLC/QLC). However, such solution may be challenging for development teams, such as design, verification, validation, and testing. Moreover, the cost of this work will be three times that of SLC memory, especially for the testing and certification teams.

Figure 2:
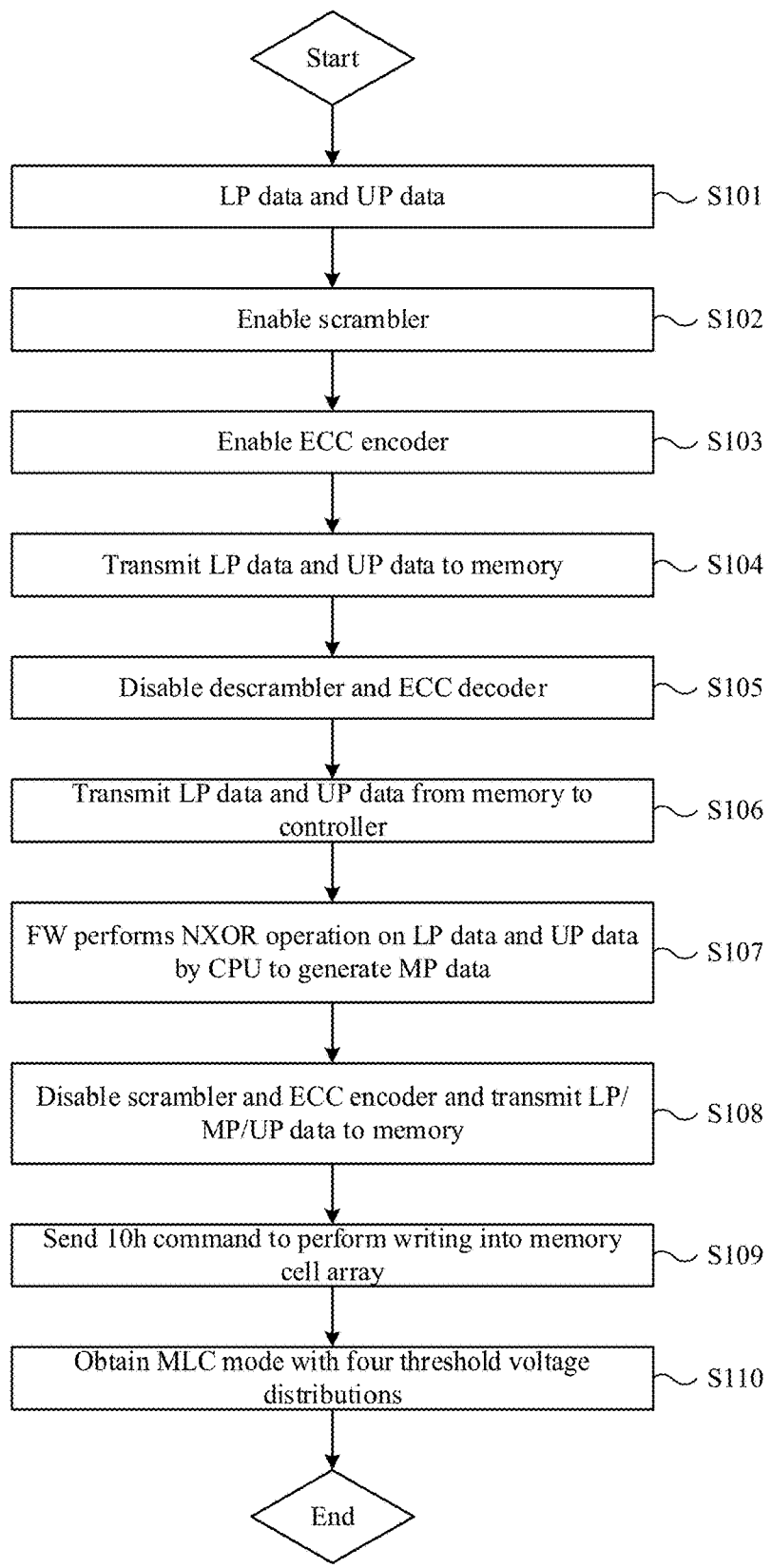
FIG. 2 is a flow chart for a writing method of a memory system illustrated according to an example.

FIG. 2 is a flowchart for a writing method of a memory system illustrated according to an example, and FIG. 3 is a schematic diagram of a memory system 10 illustrated according to an example. As shown in FIG. 2 and FIG. 3, the writing method may include the following:

S101: Receiving, by a controller 11, lower page (LP) data and upper page (UP) data;

S102: Enabling a scrambler 13 to randomize the LP data and the UP data;

S103: Enabling Error Correction Code (ECC) 14 to perform parity check on the randomized LP data and UP data;

S104: After performing the parity check, transmitting the LP data and the UP data to a memory, for example, a page buffer;

S105: Disabling a descrambler 16 and an ECC decoder 15;

S106: Transmitting the LP data and UP data from the memory to the controller 11;

S107: Running the firmware (FW) by a central processing unit (CPU) on the host side to perform an exclusive-or-not (NXOR) operation on the LP data and the UP data, so as to generate Middle Page (MP) data; here, the running firmware may be stored in memory;

S108: Disabling the scrambler 13 and the ECC encoder 14, and transmitting the LP/MP/UP data to a memory, for example, a page buffer; and S109: Sending a write command (for example, 10h), and starting to perform a write operation, for example, writing LP/MP/UP data from the page buffer to a memory cell array 12.

FIG. 4 is a schematic diagram for a writing state of a memory illustrated according to an example. With reference to FIG. 4, LP/MP/UP data is written into the memory cell array 12 by normal writing method, 3 bits of data can be stored in the memory cell of TLC memory to produce 8 different data states, i.e., an erased state E and programmed states P1 to P7. LP/MP/UP data is written into the memory cell array 12 by carrying out the method shown in FIG. 2. 3 bits of data can be stored in the memory cell of TLC memory to produce 4 different data states, i.e., an erased state E and programmed states P2, P4, P6. That is, by performing the method shown in FIG. 2, at least a portion of the storage space in the TLC memory can be used as MLC, so as to meet the application needs for the MLC memory.

However, this method needs to be performed by the CPU on the host side, resulting in a complex operation mode, and needs to run firmware to use the CPU to perform NXOR operations on raw data (e.g., LP data and UP data) to generate MP data, resulting in low efficiency.

In view of this, examples of the present disclosure provide a memory system and an operation method thereof.

FIG. 5 is a flow chart for an operation method of a memory system illustrated according to an example of the present disclosure. The memory system includes a memory that includes a memory cell array and a peripheral circuit coupled to the memory cell array. The memory cell array includes a memory cell capable of storing m bits of information, where m is a positive integer greater than 1. Referring to FIG. 5, the operation method that may include at least the following:

S201: Determining, by the peripheral circuit, the (n+1)th group of page data according to the received prefix command and the received n groups of page data, where n is a positive integer, and n+1 is a positive integer less than or equal to m; and S202: Writing n groups of page data and (n+1)th group of page data into the memory cell array, so as to generate 2n different data states in the memory cell array.

The memory includes a memory cell array and a peripheral circuit coupled to the memory cell array. The memory cell array includes a plurality of memory cells, and each memory cell can store m bits of information. For example, the memory is an MLC memory, that is, m=2. As another example, the memory is a TLC memory, that is, m=3. As yet another example, the memory is a QLC memory, that is, m=4. The peripheral circuit includes a logic control unit, a command register, a cache register, a data register, and the like.

At S201, the logic control unit in the peripheral circuit may read the prefix command stored in the command register, determine the (n+1)th group of page data according to the read prefix command and n groups of page data, and store the (n+1)th group of page data into the cache register or data register. The n groups of page data include at least one of LP data, MP data, UP data, and extra page (XP) data.

In one example, the peripheral circuit can perform logic operations on n groups of page data to generate the (n+1)th group of page data.

At S202, upon receipt of the write command, n groups of page data and (n+1)th group of page data is sequentially written into the memory cell array, and 2n different data states are generated in the memory cell array.

In one example, the memory is an MLC memory. When a part of the storage space in the MLC memory needs to be used as an SLC, the peripheral circuit determines the MP data according to the received prefix command and LP data, and writes the LP data and MP data into the memory cell array to generate two different data states in the memory cell array.

In one example, the memory is a TLC memory. When a part of the storage space in the TLC memory needs to be used as an MLC, the peripheral circuit determines the UP data according to the received prefix command, LP data, and MP data, and writes the LP data, MP data and UP data into the memory cell array to generate four different data states in the memory cell array.

In one example, the memory is a TLC memory. When a part of the storage space in the TLC memory needs to be used as an SLC, the peripheral circuit determines the MP data according to the received prefix command and LP data, and writes at least the LP data and MP data into memory cell array to generate two different data states in the memory cell array.

In one example, the memory is a QLC memory. When a part of the storage space in the QLC memory needs to be used as TLC, the peripheral circuit determines the XP data according to the received prefix command, LP data, MP data, and UP data, and writes the LP data, MP data, UP data and XP data into the memory cell array to generate eight different data states in the memory cell array.

In one example, the memory is a QLC memory. When a part of the storage space in the QLC memory needs to be used as an MLC, the peripheral circuit determines the UP data according to the received prefix command, LP data and MP data, and writes at least the LP data, MP Data and UP data into the memory cell array to generate four different data states in the memory cell array.

In one example, the memory is a QLC memory. When a part of the storage space in the QLC memory needs to be used as an SLC, the peripheral circuit determines the MP data according to the received prefix command and LP data, and writes at least the LP data and the MP data into memory cell array to generate two different data states in the memory cell array.

In the examples of the present disclosure, since the peripheral circuit can determine the (n+1)th group of page data according to the received prefix command and the received n groups of page data, write the n groups of page data and the (n+1)th group of page data into the memory cell array, and can generate 2n different data states in the memory cell array. That is, a part of the storage space of the memory can be used as at least one of SLC, MLC, TLC, and QLC. In this way, the NAND memory can be flexibly configured such that it realizes multiple modes of memory cells, and have the advantages of fast writing speed, high reliability, large storage capacity, low cost, etc.

In addition, the operation mode of determining the (n+1)th group of page data through the peripheral circuit inside the memory in the examples of the present disclosure is simple compared to the logic operation performed by the CPU on the host side, and it is beneficial to improve operation efficiency of memory while implementing multiple modes of memory cells while.

Moreover, compared with the solution of developing a general-purpose NAND memory, using the prefix command in the operation method provided by the examples of the present disclosure is more friendly, can be compatible with the existing NAND protocol, and is conducive to saving development costs.

In some examples, when n+1 is equal to m, the prefix command includes a first sub-prefix command A, wherein the first sub-prefix command A indicates to perform an XOR operation on n groups of page data.

S201 may include: performing, by the peripheral circuit, an XOR operation on n groups of page data according to the first sub-prefix command A to generate the m-th group of page data.

S202 may include: writing n groups of page data and m-th group of page data into the memory cell array, so as to store m bits of information in the memory cells.

Figure 6:
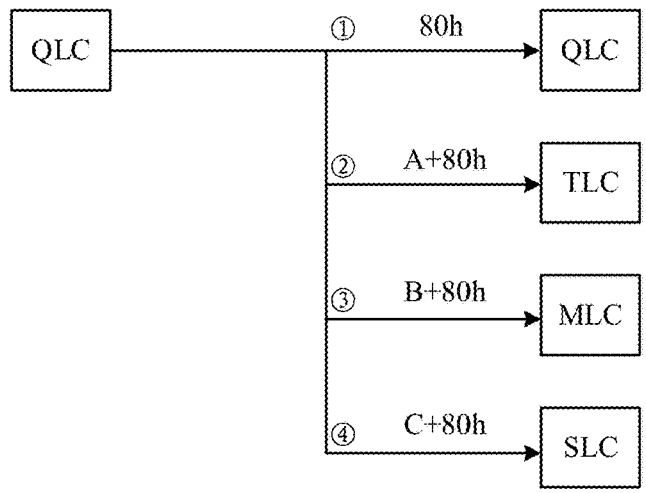
FIG. 6 is a schematic diagram of a write command performed by a memory illustrated according to an example of the present disclosure.

Taking QLC memory as an example, the memory controller sends the first sub-prefix command A, LP data, MP data and UP data to the peripheral circuit, and the peripheral circuit executes XOR operation on the LP data, MP data and UP data according to the first sub-prefix command A to generate XP data. The memory controller sends a write command (for example, 80h) to the peripheral circuit, and the peripheral circuit starts to write LP data, MP data, UP data and XP data into the memory cell array to store 4 bits of information in the memory cell, and generates eight different data states, that is, part of the storage space in the QLC memory is used as TLC, as shown at ② in FIG. 6.

Figure 7:
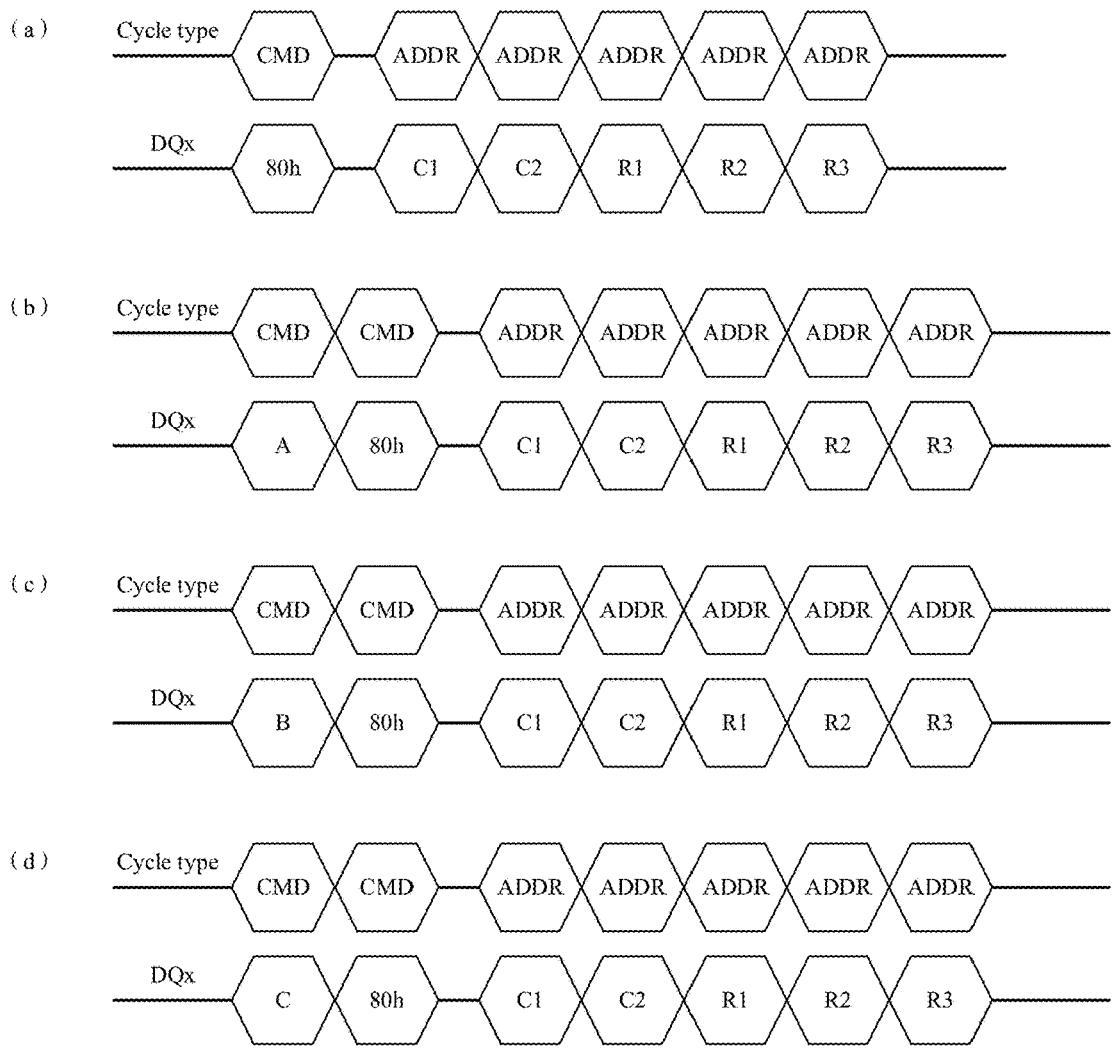
FIG. 7 is a timing diagram of a write operation performed by a memory illustrated according to an example of the present disclosure.

It is noted that the first sub-prefix command A is sent before the 80h command. Specifically, FIG. 7(b) shows a writing timing diagram for illustrating using a part of the storage space in the QLC memory as a TLC, and the timing diagram includes a data type signal Cycle Type and a data signal DQx. When writing the TLC mode in the QLC memory, the first sub-prefix command A is sent first, and then the 80h command is sent after determining the XP data. Afterwards, the address signals C1, C2, R1, R2 and R3 are sent in the address period. Through the address signals the logical address of the memory cell to be written can be determined, and the LP data, MP data, UP data and XP data are written into the memory cell. Here, the logical address includes a logical unit number (lun), a plane, a block, and a page address.

In a specific example, as shown in FIG. 8(a), the LP data is a (1111111100000000) sequence, the MP data is a (1111000000001111) sequence, and the UP data is a (1100001111000011) sequence. The peripheral circuit performs XOR operation on LP Data, MP data and UP data according to the first sub-prefix commands A to generate XP data as (1100110011001100) sequence, writes LP data, MP data, UP data and XP data into the memory cell array, and generates eight data states in the memory cell array, as shown in FIG. 8(b), which are erased state E (1111), programmed state P2 (1100), programmed state P4 (1001), programmed state P6 (1010), programmed state P8 (0011), programmed state P10 (0000), programmed state P12 (0101) and programmed state P14 (0110).

It is noted that, in this example, the LP data is a (1111111100000000) sequence, the MP data is a (1111000000001111) sequence, and the UP data is a (1100001111000011) sequence as an example, so as to convey the disclosure to those skilled in the art, but the disclosure is not limited thereto. LP data, MP data and UP data can also be other sequences composed of "1" and "0"

as long as any eight different data states from the erased state E to the programmed state P15 can be generated in the QLC memory after the XP data is generated by executing the first prefix command A on the LP data, MP data and UP data.

Figures 8, 9:
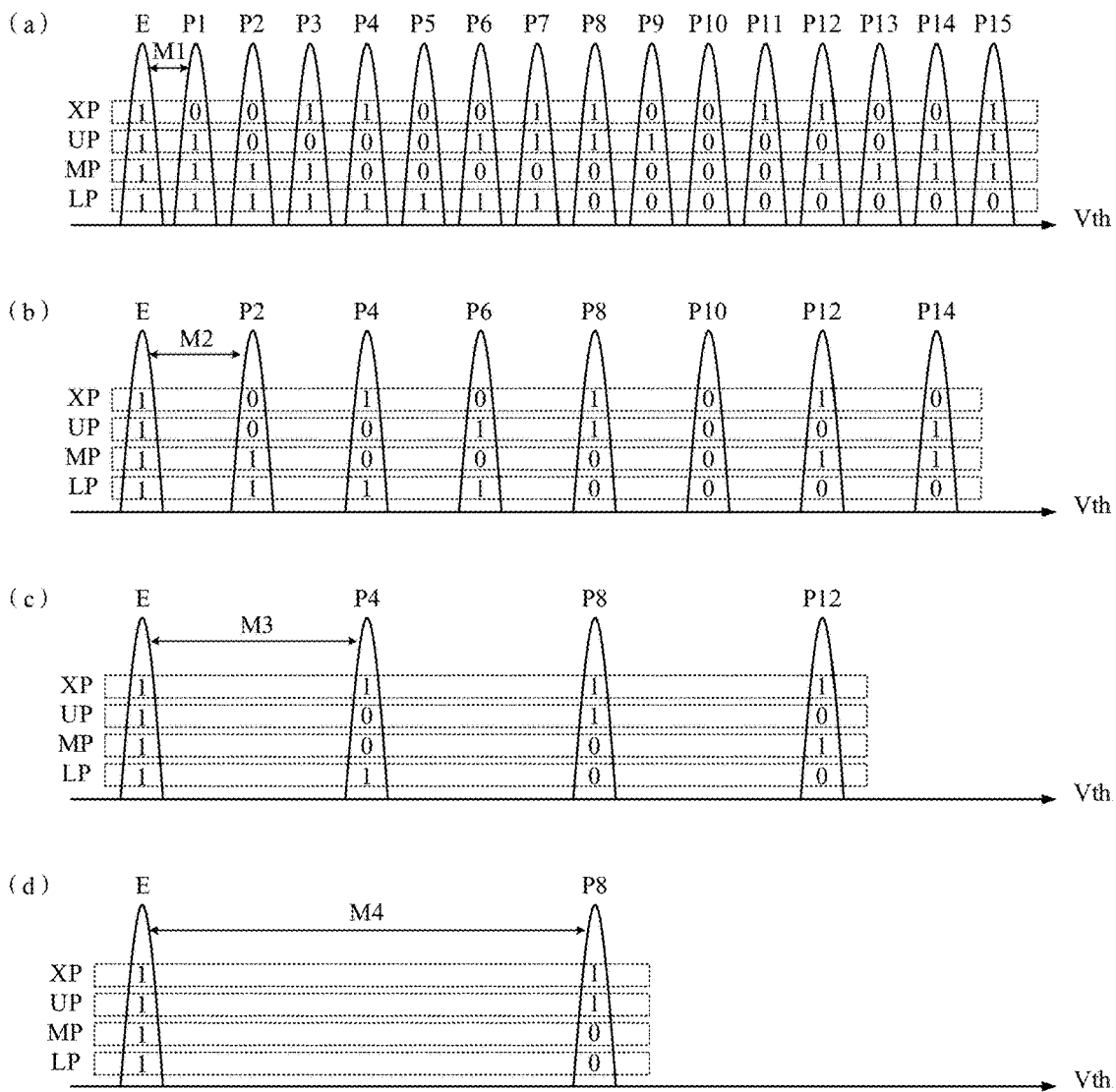
FIG. 8 is a schematic diagram illustrating a writing state of a memory illustrated according to an example of the present disclosure.
FIG. 9 is a partial schematic diagram of a peripheral circuit of a memory illustrated according to an example of the present disclosure.

In one example, the LP data is a (1111111100000000) sequence, the MP data is a (1111000000001111) sequence, and the UP data is a (1100001111000011) sequence. As shown in FIG. 8(*b*), when part of the storage space in the QLC memory is used as a TLC, the threshold voltage difference M2 between two adjacent data states is basically the same, that is, the reading margin distribution is relatively uniform, which is beneficial to ensure the accuracy of the reading operation when it used as a TLC.

In the examples of the present disclosure, when n+1 is equal to m, the peripheral circuit performs an XOR operation on n groups of page data according to the first sub-prefix command, may generate the m-th group of page data, and writes the n groups of page data with the m-th group of page data into the memory cell array. 2n different data states can be generated in the memory cell array while storing m bits of information in the memory cell. For example, when the memory is QLC, part of the storage space in the QLC memory can be used as TLC, such that the memory has at least two modes of memory cells, which is conducive to increasing the application scenarios of the memory, and can better meet customer needs while being compatible with mainstream memories.

In other examples, when n+1 is equal to m, the peripheral circuit may also perform an NXOR operation or a copy operation on the n groups of page data according to the prefix command to generate the m-th group of page data. Here, the selection can be made according to the actual situation, and the present disclosure has no special limitation on this.

In some examples, before performing S202, the above operation method further includes: storing n groups of page data into a plurality of data registers respectively, where each data register is used to store a group of page data; and storing the m-th group of page data into cache registers. The peripheral circuit includes a page buffer, and a data register or a cache register may be located in the page buffer for buffering page data.

According to one example shown in FIG. 9, LP data (1111111100000000) is stored in data register 1, MP data (1111000000001111) is stored in data register 2 and UP data (1100001111000011) is stored in data register 3. After XP data (1100110011001100) is generated, the XP data is stored in the cache register, and after receiving the 80h command, the LP data stored in data register 1, the MP data stored in data register 2, the UP data stored in data register 3, and the XP data stored in the cache register are sequentially written into the memory cell array.

In some examples, when the difference between m and n is 2, the prefix command includes a second sub-prefix command B, where the second sub-prefix command B indicates to perform an NXOR operation on n groups of page data.

TS201 may include: performing, by the peripheral circuit, an NXOR operation on n groups of page data according to the second sub-prefix command B to generate the (n+1)th group of page data.

The above operation method further includes: writing the m-th group of page data into the memory cell array, so as to store m bits of information in the memory cells, where the m-th group of page data is a sequence of all 0s or a sequence of all 1s.

Still taking the QLC memory as an example, the memory controller sends the second sub-prefix command B, LP data and MP data to the peripheral circuit, and the peripheral circuit performs an NXOR operation on the LP data and MP data according to the second sub-prefix command B to generate UP data. A write command (for example, 80h) is sent to the peripheral circuit, which starts to write LP data, MP data, UP data and XP data into the memory cell array to store 4 bits of information in the memory cell and generates four different data states, that is, part of the storage space in the QLC memory is used as MLC, as shown in ③ in FIG. 6. Here, the XP data is a sequence of all 0s or a sequence of all 1s.

It is noted that the second sub-prefix command B is sent before the 80h command. Specifically, FIG. 7(*c*) shows the timing diagram for using part of the storage space in the QLC memory as MLC. When writing the MLC mode in the QLC memory, the second sub-prefix command B is sent first, and then 80h command is sent after determining UP data. Afterwards, the address signals C1, C2, R1, R2 and R3 are sent in the address period. Through the address signals the logical address of the memory cell to be written can be determined, and the LP data, MP data, UP Data and XP data are written into memory cells.

In a specific example, as shown in FIG. 8(*a*), the LP data is a (1111111100000000) sequence, and the MP data is a (1111000000001111) sequence. The peripheral circuit executes NXOR operation on the LP data and the MP data according to the second sub-prefix command B to generate UP data as (1111000011110000) sequence and XP data as (1111111111111111) sequence, and writes LP data, MP data, UP data and XP data into the memory cell array to generate four data states in the memory cell array, as illustrated in the FIG. 8*c*, which are erased state E (1111), programmed state P4 (1001), programmed state P8 (0011) and programmed state P12 (0101).

It is noted that, in this example, the LP data is a (1111111100000000) sequence, the MP data is a (1111000000001111) sequence, and the XP data is a (1111111111111111) sequence, which are taken as an example for illustration so as to convey the present disclosure to persons skilled in the art. However, the disclosure is not limited thereto. LP data and MP data can also be other sequences composed of "1" and "0" or XP data can also be sequences of all 0s as long as any four different data states from the erased state E to the programmed state P15 can be generated in the QLC memory after the second prefix command B is executed on LP data and MP data to generate UP data.

Preferably, the LP data is a (1111111100000000) sequence, the MP data is a (1111000000001111) sequence, and the XP data is a (1111111111111111) sequence. As shown in FIG. 8(*c*), when part of the storage space in the QLC memory is used as a MLC, the threshold voltage difference M3 between two adjacent data states is basically the same, that is, the reading margin distribution is relatively uniform, which is beneficial to ensure the accuracy of the reading operation when it used as an MLC.

In the examples of the present disclosure, when the difference between m and n is 2, the peripheral circuit performs an XOR operation on n groups of page data according to the second sub-prefix command, may generate the (n+1)th group of page data, and writes n groups of page data, (n+1)th group of page data and the m-th group of page data into the memory cell array. 2n different data states can be generated in the memory cell array while m bits of information are stored in the memory cell. For example, when the memory is QLC, part of the storage space in the QLC memory can be used as MLC, such that the memory has at least two modes of memory cells, which is conducive to increasing the application scenarios of the memory, and can better meet customer needs while being compatible with mainstream memories.

In other examples, when the difference between m and n is 2, the peripheral circuit may further perform an XOR operation or a copy operation on n groups of page data according to the prefix command to generate the (n+1)th group of page data. Here, the selection can be made according to the actual situation, and the present disclosure has no special limitation on this.

In some examples, before performing S202, the above operation method further includes: storing n groups of page data and the (n+1)th group of page data into a plurality of data registers respectively, where each data register is used to store a group of page data; and before writing the m-th group of page data into the memory cell array, the above operation method further includes: storing the m-th group of page data into a cache register.

According to one example shown in FIG. 9, the LP data (1111111100000000) is stored in data register 1, the MP data (1111000000001111) is stored in data register 2, and the XP data (1111111111111111) is stored in the cache register. After the UP data is generated, the UP data (1111000011110000) is stored in data register 3. After receiving the 80h command, the LP data stored in data register 1, the MP data stored in data register 2, the UP data stored in data register 3, and the XP data stored in the cache register are sequentially written to the memory cell array.

In some examples, when the difference between m and n is 3, the prefix command includes a third sub-prefix command C, where the third sub-prefix command C indicates that the (n+1)th page data is equal to the n-th page data page data.

S201 may include: performing, by the peripheral circuit, a copy operation on n groups of page data according to the third sub-prefix command C to generate the (n+1)th group of page data.

The above operation method further includes: writing the (n+2)th group of page data and the m-th group of page data into the memory cell array, so as to store m bits of information in the memory cell, where the (n+2)th group of page data and the m-th group of page data are a sequence of all 0s or a sequence of all 1s.

Still taking the QLC memory as an example, the memory controller sends the third sub-prefix command C and LP data to the peripheral circuit, and the peripheral circuit performs a copy operation on the LP data according to the third sub-prefix command C to generate MP data. That is, MP data is the same as LP data. A write command (for example, 80h) is sent to the peripheral circuit, which starts to write LP data, MP data, UP data and XP data into the memory cell array to store 4 bits of information in the memory cell and generate two different data states, that is, part of the storage space in the QLC memory is used as SLC, as shown in ④ in FIG. 6. Here, UP data and XP data are a sequence of all 0s or a sequence of all 1s.

It is noted that the third sub-prefix command C is sent before the 80h command. Specifically, FIG. 7(d) shows the timing diagram for using part of the storage space in the QLC memory as SLC. When writing the SLC mode in the QLC memory, the third sub-prefix command C is sent first, and then 80h command is sent after determining UP data. Afterwards, the address signals C1, C2, R1, R2 and R3 are sent in the address period. Through the address signals the logical address of the memory cell to be written can be determined, and the LP data, MP data, UP Data and XP data are written into memory cells.

In a specific example, as shown in FIG. 8(a), the LP data is a (1111111100000000) sequence, and the peripheral circuit executes a copy operation on the LP data according to the third sub-prefix command C to generate the MP data as a (1111111100000000) sequence, the UP data as (1111111111111111) sequence, and XP data as (1111111111111111) sequence, and writes LP data, MP data, UP data and XP data into the memory cell array to generate two data states in memory cell array, as illustrated in FIG. 8(d), which are the erased state E (1111) and the programmed state P8 (0011) respectively.

It is noted that, in this example, the LP data is a (1111111100000000) sequence, the UP data is a (1111111111111111) sequence, and the XP data is a (1111111111111111) sequence, which are taken as an example for illustration so as to convey the present disclosure to persons skilled in the art. However, the disclosure is not limited thereto. LP data can also be other sequences composed of "1" and "0" or UP data and XP data can also be sequences of all 0s as long as any two different data states from the erased state E to the programmed state P15 can be generated in the QLC memory after the third prefix command C is executed on LP data to generate MP data.

Preferably, the LP data is a (1111111100000000) sequence, the UP data is a (1111111111111111) sequence, and the XP data is a (1111111111111111) sequence. As shown in FIG. 8(d), when part of the storage space in the QLC memory is used as a SLC, the threshold voltage difference M4 between the erased state E and the programmed state P8 is relatively large, which is beneficial to ensure the accuracy of the reading operation when it used as an MLC.

In the examples of the present disclosure, when the difference between m and n is 3, the peripheral circuit performs a copy operation on n groups of page data according to the third sub-prefix command, may generate the (n+1)th group of page data, and writes the n groups of page data, the (n+1)th group of page data, the (n+2)th group of page data and the m-th group of page data into the memory cell array. 2n different data states can be generated in the memory cell array while m bits of information are stored in the memory cell. For example, when the memory is QLC, part of the storage space in the QLC memory can be used as SLC, such that the memory has at least two modes of memory cells, which is conducive to increasing the application scenarios of the memory, and can better meet customer needs while being compatible with mainstream memories.

In some examples, before performing S202, the above operation method further includes: storing n groups of page data and the (n+1)th group of page data into a plurality of data registers respectively, where each data register is used to store a group of page data.

Before writing the (n+2)th group of page data and the m-th group of page data into the memory cell array, the above operation method further includes: storing the (n+2)th group of page data into the data register; storing the m-th group of page data into the cache register.

According to one example shown in FIG. 9, the LP data (1111111100000000) is stored in data register 1, the UP data (1111111111111111) is stored in data register 3, and the XP data (1111111111111111) is stored in the cache register. After the MP data is generated, the MP data (1111111100000000) is stored in data register 2. After receiving the 80h command, the LP data stored in data register 1, the MP data stored in data register 2, the UP data stored in data register 3, and the XP data stored in the cache register are sequentially written into the memory cell array.

In some examples, before determining the (n+1)th group of page data, the above operation method further includes:

Determining whether the peripheral circuit has received the prefix command, and generating a determination result;

Determining the (n+1)th group of page data according to the received prefix command and n groups of page data, when the determination result indicates that the peripheral circuit receives the prefix command; and Writing m groups of page data into the memory cell array to generate 2m different data states in the memory cell array, when the determination result indicates that the peripheral circuit has not received the prefix command.

Still taking the QLC memory as an example, the logic control unit in the peripheral circuit can read the command register, and determine whether the command register stores a prefix command (for example, the first sub-prefix command, the second sub-prefix command or the third sub-prefix command) based on the read result. When the read result indicates that a prefix command is stored in the command register, the peripheral circuit determines the (n+1)th group of page data according to the prefix command and n groups of page data, that is, part of the storage space of the QLC memory is used as TLC, MLC or SLC.

When the read result indicates that there is no prefix command stored in the command register, the 80h command is sent to the peripheral circuit, which writes m groups of page data into the memory cell array to store m bits of information in the memory cell and to generate 2m different data states in the memory cell array. Here, the storage space for writing m groups of page data is used as QLC, as shown in ① in FIG. 6.

In a specific example, as shown in FIG. 8(a), the LP data is a (1111111100000000) sequence, the MP data is a (1111000000001111) sequence, the UP data is a (1100001111000011) sequence, and the XP data is a (1001100110011001) sequence. The peripheral circuit writes LP data, MP data, UP data and XP data into the memory cell array according to 80h command, and generates 16 data states in the memory cell array, as illustrated in FIG. 8(a), which are the erase state E (1111), programmed state P1 (1110), programmed state P2 (1100), programmed state P3 (1101), programmed state P4 (1001), programmed state P5 (1000), programmed state P6 (1010), programmed state P7 (1011), programmed state P8 (0011), programmed state P9 (0010), programmed state P10 (0000), programmed state P11 (0001), programmed state P12 (0101), programmed state P13 (0100), programmed state P14 (0110) and programmed state P15 (0111) respectively.

In the examples of the present disclosure, by determining whether the peripheral circuit receives the prefix command and generating a determination result, it is determined whether to use part of the storage space of the QLC memory as at least one of SLC, MLC, and TLC according to the determination result, which is conducive to accurate configuration of the NAND memory.

In some examples, the above operation method further includes: when the data register is corrupted, storing a group of page data of the n groups of page data into a spare data register by the peripheral circuit. For example, referring to FIG. 9, when the data register 1 is corrupted, the peripheral circuit stores the LP data into the spare data register 4; and/or, when the data register 2 is corrupted, the peripheral circuit stores the MP data into the spare data register 5, and so on.

It is noted that only two spare data registers are shown in this example, and the number of spare data registers in the memory is not limited to 2, and may be 1, 3 or even more, which is not limited in this disclosure. In practical applications, the number of spare data registers can be reasonably set according to requirements.

An example of the present disclosure also provides a memory controller. The memory controller is coupled to a memory. The memory includes a memory cell array and a peripheral circuit coupled to the memory cell array. The memory cell array includes memory cells capable of storing m bits of information, and m is a positive integer greater than 1. The memory controller is configured to: send the prefix command and n groups of page data to the peripheral circuit, so that the peripheral circuit determines the (n+1)th group of page data according to the prefix command and n groups of page data, and generate 2n different data states in the memory cell array, where n is a positive integer, and n+1 is a positive integer less than or equal to m.

In some examples, the prefix command includes a first sub-prefix command which is used to indicate to perform an XOR operation on the n groups of page data.

The memory controller is specifically configured to: send the first sub-prefix command and n groups of page data to the peripheral circuit to cause the peripheral circuit to perform an XOR operation on the n groups of page data according to the first sub-prefix command to generate the m-th group of page data, where n+1 is equal to m.

In some examples, the prefix command includes a second sub-prefix command that is used to indicate to perform an NXOR operation on n groups of page data.

The memory controller is specifically configured to: send the second sub-prefix command and n groups of page data to the peripheral circuit to cause the peripheral circuit to perform an XOR operation on the n groups of page data according to the second sub-prefix command to generate the (n+1)th group of page data.

The memory controller is further configured to: send the m-th group of page data to the peripheral circuit, where the m-th group of page data is a sequence of all 0s or a sequence of all 1s, and the difference between m and n is 2.

In some examples, the prefix command includes a third sub-prefix command that is used to indicate that the (n+1)th group of page data is equal to the n-th group of page data.

The memory controller is specifically configured to: send the third sub-prefix command and n groups of page data to the peripheral circuit to cause the peripheral circuit to perform a copy operation on the n group of page data according to the third sub-prefix command to generate the (n+1)th group of page data.

The memory controller is further configured to: send the (n+2)th group of page data and the m-th group of page data to the peripheral circuit, where the (n+2)th group of page data and the m-th group of page data are a sequence of all 0s or a sequence of all 1s, and the difference between m and n is 3.

In some examples, the memory controller is further configured to: after sending the prefix command, send the write command to the peripheral circuit to cause the peripheral circuit to write at least the n groups of page data and the (n+1)th group of page data into the memory cell array according to the write command.

Figure 10:
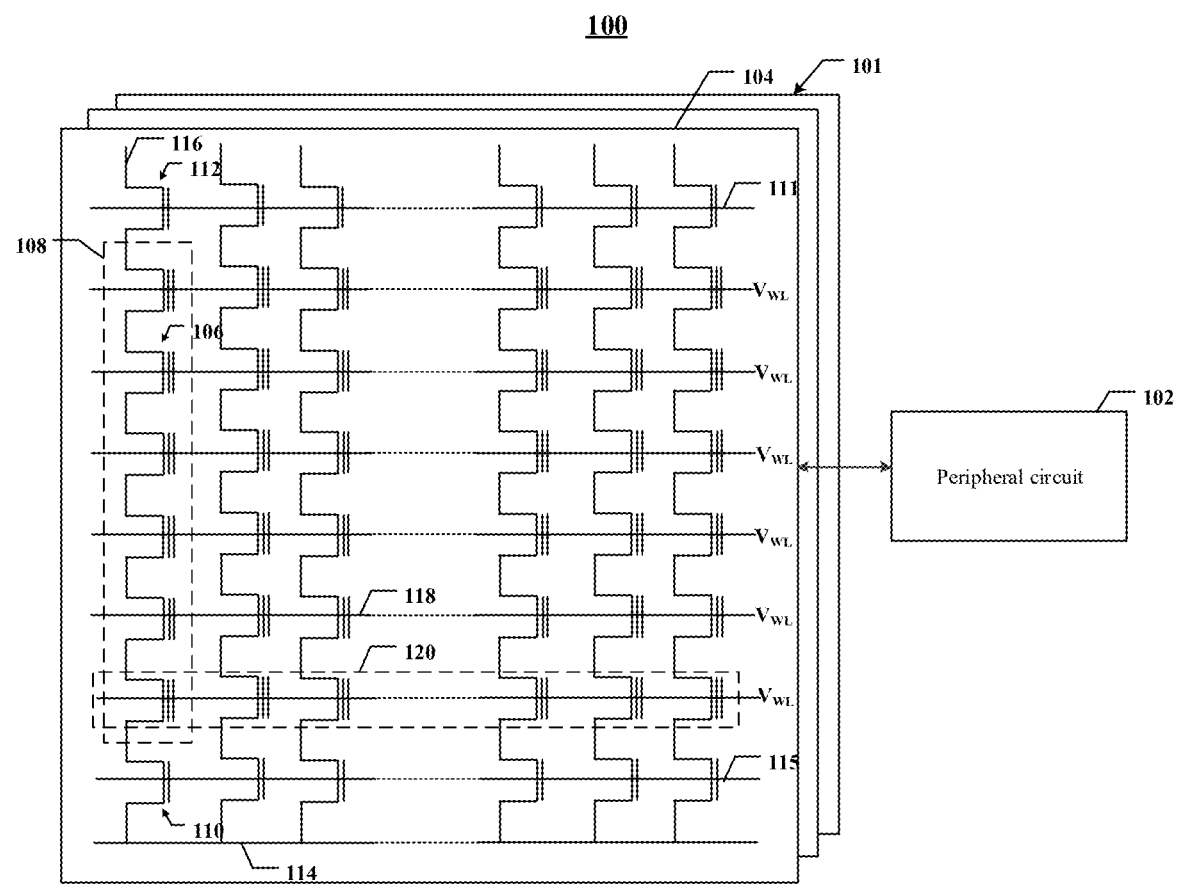
FIG. 10 is a schematic diagram of a memory illustrated according to an example of the present disclosure.

FIG. 10 is a schematic diagram of a memory 100 illustrated according to examples of the present disclosure. Referring to FIG. 10, the memory 100 includes:

A memory cell array 101 that includes a memory cell 106 capable of storing m bits of information; and A peripheral circuit 102 that is coupled to the memory cell array 101; wherein, The peripheral circuit 102 is configured to determine the (n+1)th group of page data according to the received prefix command and the received n groups of page data, where n is a positive integer, and n+1 is a positive integer less than or equal to m; and The peripheral circuit 102 is further configured to write the n group of page data and the (n+1)th group of page data into the memory cell array 101 to generate 2n different data states in the memory cell array 101.

The memory cell array 101 may be an array of NAND flash memory cells. The memory cell array 101 is provided in the form of an array of NAND memory strings 108 with each NAND memory string 1108 extending vertically. In some implementations, each NAND memory string 108 includes a plurality of memory cells 106 coupled in series and stacked vertically. Each memory cell 106 may hold a continuous analog value, such as a voltage or charge, depending on the number of electrons trapped within the area of the memory cell 106. Each memory cell 106 may be a floating-gate type memory cell including a floating gate transistor, or a charge-trap type memory cell including a charge trap transistor.

In some implementations, each memory cell 106 is a single-level cell that has two possible data states and thus can store 1 bit of data. For example, a first data state "0" may correspond to a first voltage range, and a second data state "1" may correspond to a second voltage range.

In some examples, each memory cell 106 is a cell capable of storing more than 1 bit of data in more than four data states. For example, 2 bits can be stored per cell (also referred to as a multi-level cell), 3 bits can be stored per cell (also referred as a triple-level cell), or 4 bits can be stored per cell (also referred as a quad-level cell). Each multi-level cell can be programmed to assume a range of possible nominal storage values. In one example, if each multi-level cell stores 2 bits of data, the multi-level cell can be written to assume one of the three possible data states from the erased state by writing one of three possible nominal storage values into the cell. A fourth nominal stored value may be used for the erased state.

As illustrated in FIG. 10, each NAND memory string 108 may include a source select transistor (SST) 110 at its source terminal and a drain select transistor (DST) 112 at its drain terminal. Source select transistor 110 and drain select transistor 112 may be configured to activate selected NAND memory strings 108 (a column of the array) during read and write operations.

In some implementations, the sources of the NAND memory strings 108 in the same memory block 104 are coupled through the same source line (SL) 114. In other words, according to some implementations, all NAND memory strings 108 in the same memory block 104 have an array common source (ACS).

According to some implementations, the drain select transistor 112 of each NAND memory string 108 is coupled to a corresponding bit line 116 from which data can be read or written via an output bus (not shown).

In some implementations, each NAND memory string 108 is configured to apply a select voltage (e.g., higher than the threshold voltage of the drain select transistor 112) or a deselect voltage (e.g., 0V) to the corresponding drain select gate via one or more drain select gate lines 111, where the select voltage is used to turn on the drain select transistor 112 and the deselect voltage is used to turn off the drain select transistor 112. And/or, in some implementations, each NAND memory string 108 is configured to apply a select voltage (e.g., higher than the threshold voltage of the source select transistor 110) or a deselect voltage (e.g., 0V) to the corresponding source select gate via one or more source select gate lines 115, where the select voltage is used to turn on the source select transistor 110 and the deselect voltage is used to turn off the source select transistor 110.

As illustrated in FIG. 10, NAND memory string 108 may be organized into a plurality of memory blocks 104, each of which may have a common source line 114 (e.g., coupled to ground). In some implementations, each memory block 104 is the basic data unit for an erase operation. That is, all memory cells 106 on the same memory block 104 are erased simultaneously.

It should be appreciated that, in some examples, erase operations may be performed at the half-block level, at the quarter-block level, or at any suitable number or fraction of blocks. The memory cells 106 of adjacent NAND memory strings 108 may be coupled by word lines 118 that select which row of memory cells 106 is affected by read and write operations.

In some implementations, each word line 118 is referenced as a memory page 120. The size of a memory page 120 in bits may be related to the number of NAND memory strings 108 coupled by word lines 118 in a memory block 104. Each word line 118 may include a plurality of control gates (gate electrodes) at each memory cell 106 in a corresponding memory page 120 and a gate line coupling the control gates. It can be understood that a memory cell row is a plurality of memory cells 106 located in the same memory page 120.

Figure 11:
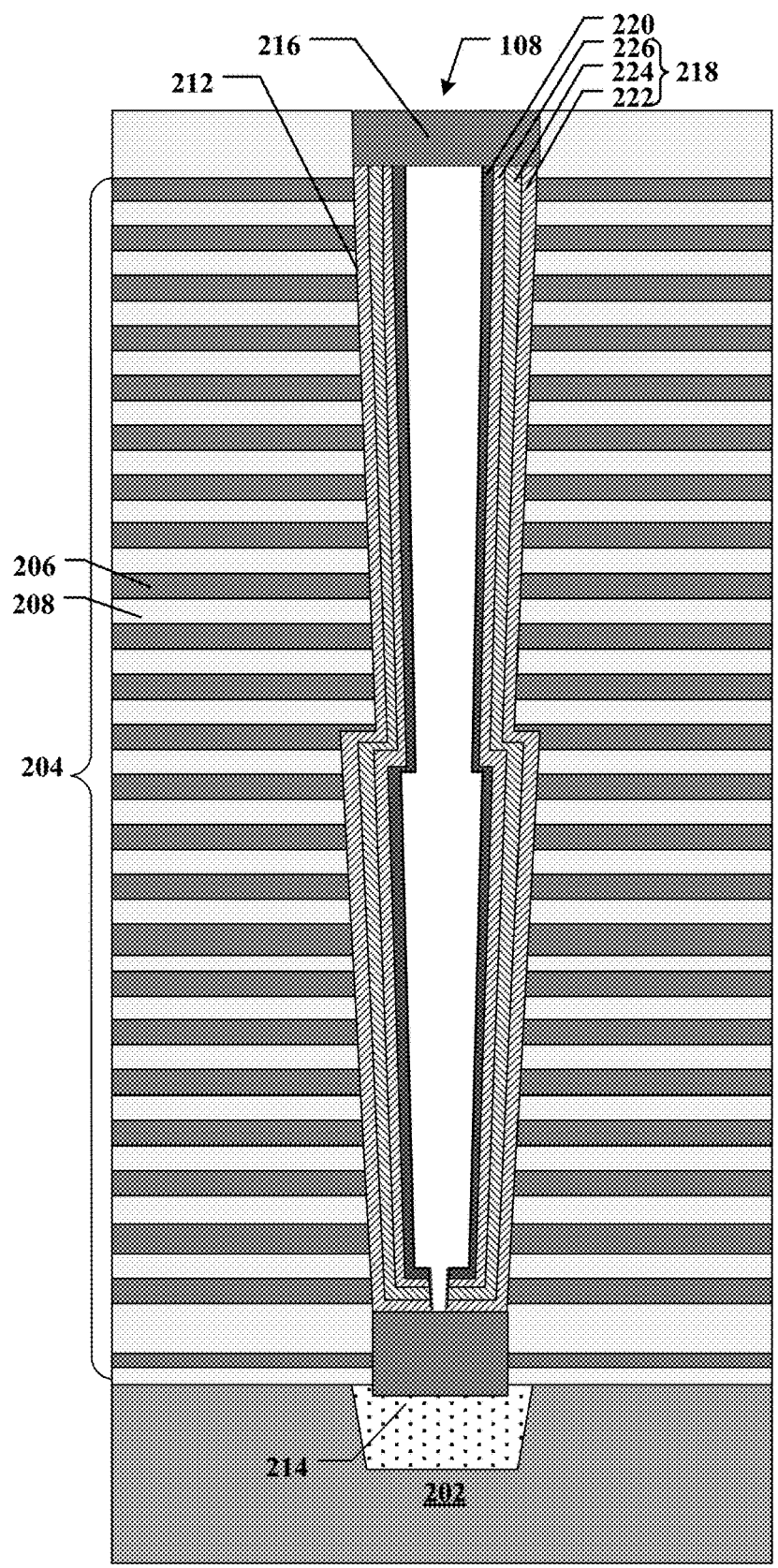
FIG. 11 is a cross-sectional view of a NAND memory string illustrated according to an example of the present disclosure.

FIG. 11 is a cross-sectional view of a NAND memory string 108 illustrated according to examples of the present disclosure. As illustrated in FIG. 11, NAND memory string 108 may extend vertically above substrate 202 through memory stack layer 204. The substrate 202 may comprise silicon (e.g., monocrystalline silicon), silicon germanium (SiGe), gallium arsenide (GaAs), germanium (Ge), silicon-on-insulator (SOI), germanium-on-insulator (GOI), or any other suitable Material.

The memory stack layer 204 may include alternating gate conductive layers 206 and gate dielectric layers 208. The number of pairs of gate conductive layer 206 and gate dielectric layer 208 in memory stack layer 204 may determine the number of memory cells 106 in memory cell array 101.

The gate conductive layer 206 may include conductive materials including but not limited to tungsten (W), cobalt (Co), copper (Cu), aluminum (Al), polysilicon, doped silicon, silicide or any combination thereof. In some implementations, each gate conductive layer 206 may include a metal layer, e.g., a tungsten layer. In some implementations, each gate conductive layer 206 may include a doped polysilicon layer. Each gate conductive layer 206 may include a control gate surrounding the memory cell 106 and may extend laterally at the top of the memory stack layer 204 as a drain select gate line 111 and laterally at the bottom of the memory stack layer 204 as the source selection gate line 115, or extend laterally between the drain selection gate line 111 and the source selection gate line 115 as the word line 118.

As illustrated in FIG. 11, NAND memory string 108 includes a channel structure 212 extending vertically through memory stack layer 204. In some examples, the channel structure 212 includes a channel hole filled with semiconductor material(s) (e.g., as the semiconductor channel 220) and a dielectric material(s) (e.g., as the storage film 218). In some examples, semiconductor channel 220 includes silicon, e.g., polysilicon. In some examples, storage film 218 is a composite dielectric layer including tunneling layer 226, storage layer 224 (also referred to as "charge trapping/storage layer"), and barrier layer 222. The channel structure 212 may have a cylindrical shape (e.g., a pillar shape). According to some examples, the semiconductor channel 220, the tunneling layer 226, the storage layer 224 and the barrier layer 222 are radially arranged in this order from the center of the cylinder toward the outer surface of the cylinder. The tunneling layer 226 may include silicon oxide, silicon oxynitride, or any combination thereof. The storage layer 224 may include silicon nitride, silicon oxynitride, or any combination thereof. Barrier layer 222 may include silicon oxide, silicon oxynitride, high permittivity (high-k) dielectrics, or any combination thereof. In one example, the storage film 218 may include a composite layer of silicon oxide/silicon oxynitride/silicon oxide (ONO).

According to some examples, as illustrated in FIG. 11, a well 214 (e.g., a P-well and/or an N-well) is formed in the substrate 202, and the source terminal of the NAND memory string 108 is in contact with the well 214. In some implementations, the NAND memory string 108 further includes a channel plug 216 at the drain terminal of the NAND memory string 108. It should be understood that although not shown in FIG. 11, additional components of the memory cell array 101 may be formed, including but not limited to gate line gaps/source contacts, local contacts, interconnect layers, and the like.

Referring back to FIG. 10, peripheral circuit 102 may be coupled to memory cell array 101 through bit lines 116, word lines 118, source lines 114, source select gate lines 115, and drain select gate lines 111. Peripheral circuit 102 may include any suitable analog, digital, and mixed-signal circuitry for applying voltage signals and/or current signals to each memory cell 106 through bit lines 116, word lines 118, source lines 114, source select gate lines 115, and drain select gate lines 111 and sensing voltage signals and/or current signals from each memory cell 106 to facilitate operation of the memory cell array 101.

In some examples, when n+1 is equal to m, the prefix command includes a first sub-prefix command, where the first sub-prefix command indicates to perform an XOR operation on n groups of page data.

The peripheral circuit 102 is specifically configured to perform an XOR operation on n groups of page data according to the first sub-prefix command to generate an m-th group of page data.

The peripheral circuit 102 is also specifically configured to write n groups of page data and m-th group of page data into the memory cell array, so as to store m bits of information in the memory cells.

In some examples, peripheral circuit 102 includes:
a plurality of data registers that are used to store n groups of page data, where each data register is used to store a group of page data; and
a cache register that is used to store the m-th group of page data.

In some examples, peripheral circuit 102 includes:
a spare data register that is used to store a group of page data in n groups of page data when the data register is corrupted.

In some examples, when the difference between m and n is 2, the prefix command includes a second sub-prefix command, where the second sub-prefix command indicates to perform an NXOR operation on n groups of page data.

The peripheral circuit 102 is specifically configured to perform an NXOR operation on n groups of page data according to the second sub-prefix command to generate the (n+1)th group of page data.

The peripheral circuit 102 is further configured to write the m-th group of page data into the memory cell array to store m bits of information in the memory cells, where the m-th group of page data is a sequence of all 0s or a sequence of all 1s.

In some examples, peripheral circuit 102 includes:
a plurality of data registers that are used to store n groups of page data and the (n+1)th group of page data, where each data register is used to store a group of page data; and
a cache register that is used to store the m-th group of page data.

In some examples, when the difference between m and n is 3, the prefix command includes a third sub-prefix command, where the third sub-prefix command indicates that the (n+1)th group of page data is equal to the n-th group of page data.

The peripheral circuit 102 is specifically configured to perform a copy operation on n groups of page data according to the third sub-prefix command to generate the (n+1)th group of page data.

The peripheral circuit 102 is further configured to write the (n+2)th group of page data and the m-th group of page data into the memory cell array, so as to store m bits of information in the memory cells; wherein, the (n+2)th group of page data and the m-th group of page data are a sequence of all 0s or a sequence of all 1s.

In some examples, peripheral circuit 102 includes:
a plurality of data registers that are used to store n groups of page data, (n+1)th group of page data and (n+2)th group of page data, where each data register is used to store a group of page data; and
a cache register that is used to store the m-th group of page data.

In some examples, peripheral circuit 102 is further configured to:
before determining the (n+1)th group of page data, determine whether a prefix command is received, and generate a determination result;
when the determination result indicates that the prefix command is received, determine the (n+1)th group of page data according to the received prefix command and n groups of page data; and
when the determination result indicates that the prefix command is not received, write m groups of page data into the memory cell array to generate 2m different data states in the memory cell array.

Figure 12:
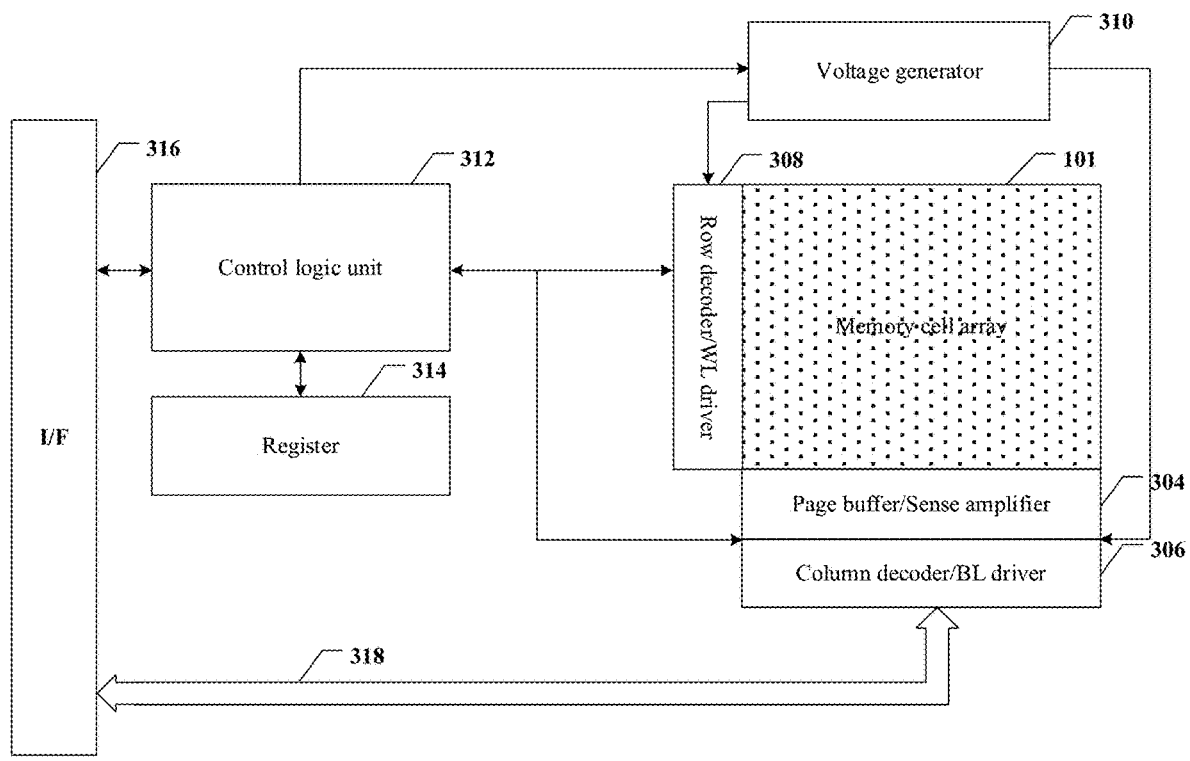
FIG. 12 is a block diagram of a memory including a memory cell array and peripheral circuits illustrated according to an example of the present disclosure.

The peripheral circuit 102 may include various types of peripheral circuits formed using metal-oxide-semiconductor (MOS) technology. For example, FIG. 12 shows some example peripheral circuits 102 including a page buffer/sense amplifier 304, a column decoder/bit line (BL) driver 306, a row decoder/word line (WL) driver 308, a voltage generator 310, a control logic unit 312, a register 314, an interface 316 and a data bus 318. It should be understood that in some examples, additional peripheral circuit not shown in FIG. 12 may further be included.

The page buffer/sense amplifier 304 may be configured to read data from and write (program) data to the memory cell array 101 of FIG. 10 according to control signals from the control logic unit 312. In one example, the page buffer/sense amplifier 304 may store one page of write data (programmed data) to be programmed into one memory page 120 of the memory cell array 101 of FIG. 10. In another example, the page buffer/sense amplifier 304 may perform a program verify operation to ensure that data has been correctly programmed into the memory cells 106 coupled to the selected word line 118. In yet another example, page buffer/sense amplifier 304 may further sense a low power signal from bit line 116 representing a data bit stored in memory cell 106 and amplify the small voltage swing into a recognizable logic level during a read operation. Column decoder/bit line driver 306 may be configured to be controlled by control logic unit 312 and to select one or more NAND memory strings 108 by applying bit line voltages generated from voltage generator 310.

The row decoder/word line driver 308 may be configured to be controlled by the control logic unit 312 and to select/deselect the memory blocks 104 of the memory cell array 101 of FIG. 10 and select/deselect the word lines 118 of the memory blocks 104. Row decoder/wordline driver 308 may further be configured to drive wordline 118 using a wordline voltage (VWL) generated from voltage generator 310. In some implementations, the row decoder/wordline driver 308 can also select/deselect and drive the source select gate line 115 and the drain select gate line 111. As described in detail below, the row decoder/wordline driver 308 is configured to perform erase operations on the memory cells 106 coupled to the selected wordline(s) 118. The voltage generator 310 may be configured to be controlled by the control logic unit 312 and to generate word line voltages (e.g., read voltages, write voltages, pass voltages, local voltages, verify voltages, etc.), bit line voltage and source line voltage to be supplied to the memory cell array 101 of FIG. 10.

Control logic unit 312 may be coupled to each of the peripheral circuits described above and configured to control the operation of each of the peripheral circuits. The registers 314 may be coupled to the control logic unit 312 and include status registers, command registers and address registers for storing status information, command operation codes (OP codes) and command addresses for controlling the operation of each peripheral circuit. Interface 316 may be coupled to control logic unit 312 and act as a control buffer to buffer control commands received from a host (not shown) and relay it to control logic unit 312, and to buffer status information received from control logic unit 312 and relay it to the host. Interface 316 may also be coupled to column decoder/bit line driver 306 via data bus 318 and act as a data I/O interface and data buffer to buffer data and relay it to or from memory cell array 101 of FIG. 10.

It should be emphasized that the peripheral circuit 102 is configured to perform the write operation provided by the examples of the present disclosure on a selected row of memory cells among the plurality of rows of memory cells.

Figure 13:
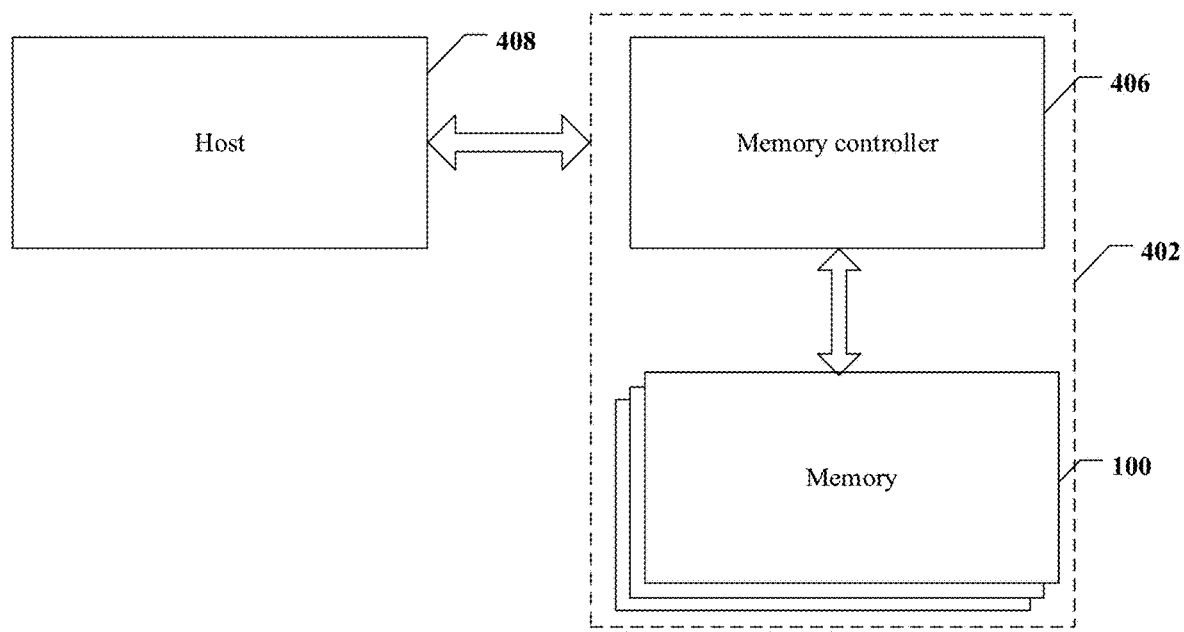
FIG. 13 is a schematic diagram of a memory system illustrated according to an example of the present disclosure.

FIG. 13 is a schematic diagram of a memory system 400 illustrated according to examples of the present disclosure. Referring to FIG. 13, the memory system 400 includes:
  one or more memories 100 as described in the above-mentioned embodiments; and
  the memory controller 406 as described in the above examples that is coupled to the memory 100 and configured to control the memory 100.

System 400 may be a mobile phone, desktop computer, laptop computer, tablet computer, vehicle computer, game console, printer, pointing device, wearable electronic device, smart sensor, virtual reality (VR) device, augmented reality (AR) device or any other suitable electronic device having storage therein.

As shown in FIG. 13, the system 400 may include a host 408 and a storage subsystem 402 having one or more memories 100. The storage subsystem includes further a memory controller 406. The host 408 may be a processor (e.g., a central processing unit (CPU)) or a system on a chip (SoC) (e.g., an application processor (AP)) of an electronic device. The host 408 may be configured to send data to memory 100. Or the host 408 may be configured to receive data from memory 100.

The memory 100 may be any memory device disclosed in this disclosure. The memory 100 (e.g., a NAND flash memory device (e.g., a three-dimensional (3D) NAND flash memory device)) may have reduced leakage current from drive transistors (e.g., string drivers) coupled to unselected word lines during an erase operation, which allows further size reduction of the drive transistor.

According to some implementations, memory controller 406 is further coupled to host 408. Memory controller 406 may manage data stored in memory 100 and communicate with host 408.

In some implementations, memory controller 406 is designed to operate in low duty-cycle environments such as Secure Digital (SD) cards, Compact Flash (CF) cards, Universal Serial Bus (USB) flash drives, or other media for use in electronic devices such as personal computers, digital cameras, mobile phones, and the like.

In some implementations, the memory controller 406 is designed for operation in a high duty-cycle environment solid state drive (SSD) or embedded multimedia card (eMMC). SSD or eMMC is used as data storage for mobile devices such as smartphones, tablet computers, laptop computers, etc., and enterprise memory arrays.

The memory controller 406 may be configured to control operations of the memory 100, such as read, erase, and program operations. The memory controller 406 may further be configured to manage various functions related to data stored or to be stored in the memory 100, including but not limited to bad block management, garbage collection, logical-to-physical address translation, wear leveling, and the like. In some implementations, memory controller 406 is further configured to process error correction code (ECC) on data read from or written to memory 100.

Memory controller 406 may further perform any other suitable functions, such as formatting memory 100. Memory controller 406 may communicate with external devices (e.g., host 408) according to a particular communication protocol. For example, the memory controller 406 can communicate with external devices through at least one of various interface protocols, such as USB protocol, MMC protocol, Peripheral Component Interconnect (PCI) protocol, PCI Express (PCI-E) protocol, Advanced Technology Attachment (ATA) protocol, Serial ATA protocol, Parallel ATA protocol, Small Computer Small Interface (SCSI) protocol, Enhanced Small Disk Interface (ESDI) protocol, Integrated Drive Electronics (IDE) protocol, Firewire protocol, etc.

The memory controller 406 and the one or more memory 100 may be integrated into various types of storage devices, e.g., be included in the same package (e.g., a Universal Flash Storage (UFS) package or an eMMC package). That is, the memory system 400 can be implemented and packaged into different types of end electronic products.

Figure 14A:
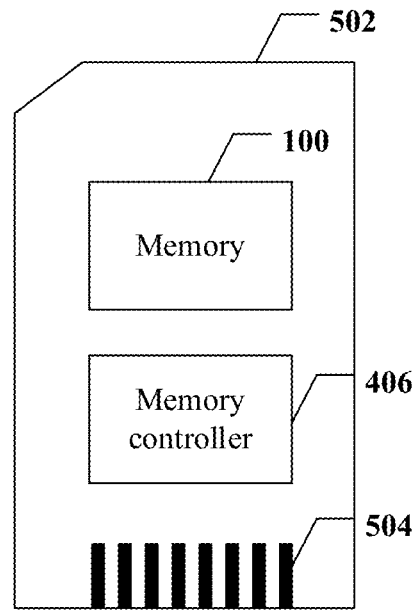
FIG. 14*a* is a schematic diagram of a memory card illustrated according to an example of the present disclosure.

In one example as shown in FIG. 14a, memory controller 406 and a single memory 100 may be integrated into memory card 502. The memory card 502 may include a PC card (PCMCIA, Personal Computer Memory Card International Association), CF card, Smart Media (SM) card, memory stick, multimedia card (MMC, RS-MMC, MMC-micro), SD card (SD, miniSD, microSD, SDHC), UFS, etc. The memory card 502 may further include a memory card connector 504 that couples the memory card 502 with a host (e.g., host 408 in FIG. 13).

Figure 14B:
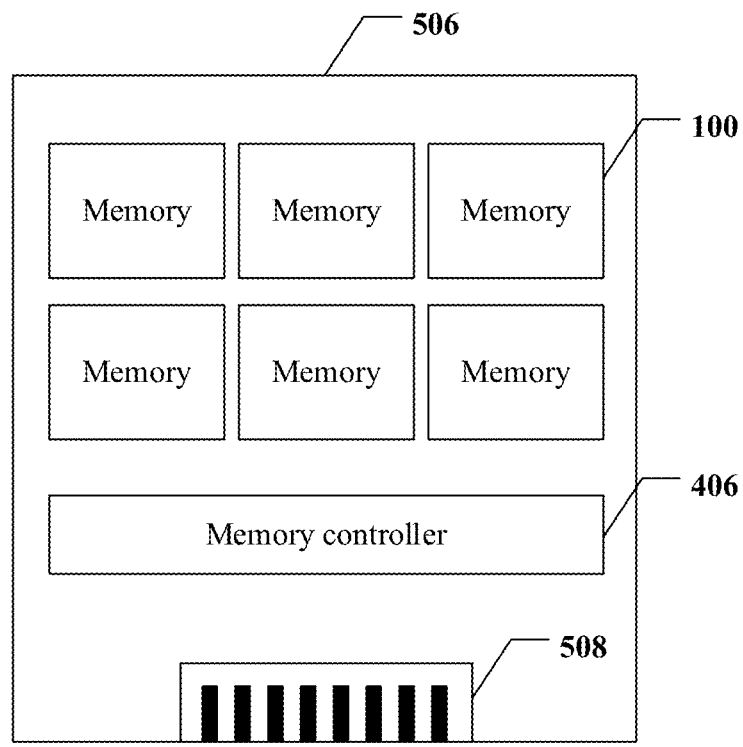
FIG. 14*b* is a schematic diagram of a solid state drive (SSD) illustrated according to an example of the present disclosure.

In another example as shown in FIG. 14b, the memory controller 406 and the plurality of memories 100 may be integrated into a solid state drive (SSD) 506. The solid state drive 506 may further include a solid state drive connector 508 that couples the solid state drive 506 to a host (e.g., host 408 in FIG. 13). In some implementations, the storage capacity and/or operating speed of the solid state drive 506 is greater than the storage capacity and/or operating speed of the memory card 502.

It can be understood that the memory controller 406 can perform the operation method provided by any examples of the present disclosure.

According to a first aspect of the present disclosure, there is provided an operation method for a memory system, the memory system including a memory, the memory including a memory cell array and a peripheral circuit coupled to the memory cell array, the memory cell array including memory cells capable of storing m bits of information, m is a positive integer greater than 1; the operation method includes:

determining, by the peripheral circuit, (n+1)th group of page data according to a received prefix command and received n groups of page data, wherein n is a positive integer, and n+1 is a positive integer less than or equal to m; and writing the n groups of page data and the (n+1)th group of page data into the memory cell array to generate 2n different data states in the memory cell array.

According to a second aspect of the present disclosure, there is provided a memory controller, the memory controller being coupled to a memory, the memory including a memory cell array and a peripheral circuit coupled to the memory cell array, the memory cell array including memory cells capable of storing m bits of information, m is a positive integer greater than 1; the memory controller is configured to:

send a prefix command and n groups of page data to the peripheral circuit to enable the peripheral circuit to determine (n+1)th group of page data according to the prefix command and the n groups of page data, and to generate 2n different data states in the memory cell array, wherein n is a positive integer, and n+1 is a positive integer less than or equal to m.

According to a third aspect of the present disclosure, there is provided a memory, including:

a memory cell array including memory cells capable of storing m bits of information;
a peripheral circuit coupled to the memory cell array; wherein,
the peripheral circuit is configured to determine the (n+1)th group of page data according to the received prefix command and the received n groups of page data; wherein, n is a positive integer, and n+1 is a positive integer less than or equal to m; and
the peripheral circuit is further configured to write then groups of page data and the (n+1)th group of page data into the memory cell array, so as to generate 2n different data states in the memory cell array.

According to a fourth aspect of the present disclosure, there is provided a memory system, including:

the memory according to the third aspect of the present disclosure; and
the memory controller according to the second aspect of the present disclosure, coupled to the memory and configured to control the memory.

In the examples of the present disclosure, the peripheral circuit can determine the (n+1)th group of page data according to the received prefix command and the received n groups of page data, write the n groups of page data with the (n+1)th group of page data into the memory cell array, and can generate 2n different data states in the memory cell array. That is, part of the storage space of the memory can be used as at least one of SLC, MLC, TLC, and QLC. In this way, the NAND memory can be flexibly configured such that it can realize multiple modes of memory cells, and can offer the advantages of fast writing speed, high reliability, large storage capacity, low cost, etc.

Apparently, the above-mentioned examples are only examples for clear description, rather than limiting the implementation. For those of ordinary skill in the art, other changes or alterations in different forms can be made on the basis of the above description. It is not necessary and impossible to exhaustively list all the implementations herein. The obvious changes or alterations derived therefrom fall within the protection scope created by the present disclosure.

What is claimed is:

1. An operation method for a memory system, the memory system including a memory, the memory including a memory cell array and a peripheral circuit coupled to the memory cell array, the memory cell array including memory cells capable of storing m bits of information, wherein m is a positive integer greater than 1, and wherein the memory cell array stores data in at least a first writing state, the operation method comprising:

receiving a prefix command and n groups of page data, wherein n is a positive integer, and n+1 is a positive integer less than or equal to m, wherein the received prefix command corresponds to a command to store data in a second writing state, and wherein the second writing state is selected based on a function of the memory;

generating, by the peripheral circuit, a (n+1)th group of page data based on the received prefix command and the n groups of page data, wherein the n groups of page data include lower page data, middle page data, upper page data, and extra page data, wherein the received prefix command includes a logic operation to generate the (n+1)th group of page data based on the second writing state, and wherein the second writing state stores data in less data states than the first writing state; and writing the n groups of page data and the (n+1)th group of page data based on the second writing state into a memory cell of the memory cell array to generate $2^n$ different data states in the memory cell array, wherein the memory cell of the memory cell array includes a data state of the $2^n$ different data states.

2. The operation method of claim 1, wherein, when n+1 is equal to m, the prefix command includes a first sub-prefix command, wherein the first sub-prefix command indicates to perform an XOR operation on the n groups of page data, and wherein:

the generating, by the peripheral circuit, the (n+1)th group of page data according to the received prefix command and the n groups of page data further includes performing, by the peripheral circuit, the XOR operation on the n groups of page data according to the first sub-prefix command to generate a m-th group of page data; and the writing the n groups of page data and the (n+1)th group of page data into the memory cell array further includes writing the n groups of page data and the m-th group of page data into the memory cell array to store m bits of information in the memory cells.

3. The operation method of claim 2, wherein, before writing the n groups of page data and the m-th group of page data into the memory cell array, the operation method further includes:

storing the n groups of page data to a plurality of data registers respectively, wherein each of the data registers is used to store a group of page data; and storing the m-th group of page data to a cache register.

4. The operation method of claim 1, wherein, when the difference between m and n is 2, the prefix command includes a second sub-prefix command, wherein the second sub-prefix command indicates to perform an NXOR operation on the n groups of page data, and wherein:

the generating, by the peripheral circuit, the (n+1)th group of page data according to the received prefix command and the n groups of page data further includes performing, by the peripheral circuit, the NXOR operation on the n groups of page data according to the second sub-prefix command to generate the (n+1)th group of page data; and the operation method further includes writing a m-th group of page data into the memory cell array, so as to store m bits of information in the memory cells, wherein the m-th group of page data is a sequence of all 0s or a sequence of all 1s.

5. The operation method of claim 1, wherein, when the difference between m and n is 3, the prefix command includes a third sub-prefix command, wherein the third sub-prefix command indicates that the (n+1)th group of page data is equal to an n-th group of page data of the n groups of page data, and wherein:

the generating, by the peripheral circuit, the (n+1)th group of page data according to the received prefix command and the n groups of page data further includes performing, by the peripheral circuit, a copy operation on the n groups of page data according to the third sub-prefix command to generate the (n+1)th group of page data; and the operation method further includes writing a (n+2)th group of page data and a m-th group of page data into the memory cell array to store m bits of information in the memory cells, wherein the (n+2)th group of page data and the m-th group of page data are a sequence of all 0s or a sequence of all 1s.

6. The operation method of claim 1, wherein, before generating the (n+1)th group of page data, the operation method further includes:

determining whether the prefix command is received, and generating a determination result; and determining the (n+1)th group of page data according to the received prefix command and the n groups of page data when the determination result indicates that the prefix command is received.

7. The operation method of claim 6, wherein, when the determination result indicates that the prefix command is not received, m groups of page data is written into the memory cell array so as to generate $2^m$ different data states in the memory cell array.

8. A memory controller, the memory controller to be coupled to a memory, the memory including a memory cell array and a peripheral circuit coupled to the memory cell array, the memory cell array including memory cells capable of storing m bits of information, wherein m is a positive integer greater than 1, wherein the memory cell array stores data in at least a first writing state, and wherein the memory controller configured to at least:

send a prefix command and n groups of page data to the peripheral circuit to cause the peripheral circuit to generate a (n+1)th group of page data according to the prefix command and the n groups of page data, wherein n is a positive integer and n+1 is a positive integer less than or equal to m, wherein the n groups of page data include lower page data, middle page data, upper page data, and extra page data, wherein the prefix command is to include a logic operation to generate the (n+1)th group of page data based on a second writing state, wherein the second writing state is selected based on a function of the memory, and wherein the second writing state stores data in less data states than the first writing state;

generate $2^n$ different data states in the memory cell array, wherein a memory cell of the memory cell array includes a data state of the $2^n$ different data states; and cause writing of the n groups of page data and the (n+1)th group of page data based on the second writing state into the memory cell of the memory cell array.

9. The memory controller of claim 8, wherein the prefix command includes a first sub-prefix command, and the first sub-prefix command is used to indicate to perform an XOR operation on the n groups of page data and the memory controller is further configured to send the first sub-prefix command and the n groups of page data to the peripheral circuit to cause the peripheral circuit to perform the XOR operation on the n groups of page data according to the first sub-prefix command to generate a m-th group of page data, wherein n+1 is equal to m.

10. The memory controller of claim 8, wherein the prefix command includes a second sub-prefix command, and the second sub-prefix command is used to indicate to perform an NXOR operation on the n groups of page data, and the memory controller is further configured to:

send the second sub-prefix command and the n groups of page data to the peripheral circuit to cause the peripheral circuit to perform the NXOR operation on the n groups of page data according to the second sub-prefix command to generate the (n+1)th group of page data; and send a m-th group of page data to the peripheral circuit, wherein the m-th group of page data is a sequence of all 0s or a sequence of all 1s, and the difference between m and n is 2.

11. The memory controller of claim 8, wherein the prefix command includes a third sub-prefix command, and the third sub-prefix command is used to indicate that the (n+1)th group of page data is equal to an n-th group page data, and the memory controller is further configured to:

send the third sub-prefix command and the n groups of page data to the peripheral circuit to cause the peripheral circuit to perform a copy operation on the n groups of page data according to the third sub-prefix command to generate the (n+1)th group of page data; and send a (n+2)th group of page data and a m-th group of page data to the peripheral circuit, wherein the (n+2)th group of page data and the m-th group of page data is a sequence of all 0s or a sequence of all 1s, and the difference between m and n is 3.

12. The memory controller of claim 8, wherein the memory controller is further configured to, after sending the prefix command, send a write command to the peripheral circuit to cause the peripheral circuit to, according to the write command, write at least the n groups of page data and the (n+1)th group of page data into the memory cell array.

13. A memory comprising:
a memory cell array including memory cells capable of storing m bits of information;
a peripheral circuit coupled to the memory cell array, wherein the memory cell array stores data in at least a first writing state, and wherein the peripheral circuit is configured to:
receive a prefix command and n groups of page data, wherein n is a positive integer, and n+1 is a positive integer less than or equal to m, wherein the received prefix command corresponds to a command to store data in a second writing state, and wherein the second writing state is selected based on a function of the memory;
generate a (n+1)th group of page data based on the received prefix command and the n groups of page data, wherein the n groups of page data include lower page data, middle page data, upper page data, and extra page data, wherein the received prefix command includes a logic operation to generate the (n+1)th group of page data based on the second writing state, and wherein the second writing state stores data in less data states than the first writing state; and
write the n groups of page data and the (n+1)th group of page data based on the second writing state into a memory cell of the memory cell array to generate $2^n$ different data states in the memory cell array, wherein the memory cell of the memory cell array includes a data state of the $2^n$ different data states.

14. The memory of claim 13, wherein, when n+1 is equal to m, the prefix command includes a first sub-prefix command, wherein the first sub-prefix command indicates to perform an XOR operation on the n groups of page data, and the peripheral circuit is further configured to:
perform the XOR operation on the n groups of page data according to the first sub-prefix command to generate a m-th group of page data; and
write the n groups of page data and the m-th group of page data into the memory cell array to store m bits of information in the memory cells.

15. The memory of claim 14, wherein the peripheral circuit includes:
a plurality of data registers that are used to store the n groups of page data, wherein each of the data registers is used to store a group of page data; and
a cache register that is used to store the m-th group of page data.

16. The memory of claim 15, wherein the peripheral circuit includes a spare data register that is used to store the group of page data of the n groups of page data when a data register of the plurality of data registers is corrupted.

17. The memory of claim 13, wherein, when the difference between m and n is 2, the prefix command includes a second sub-prefix command, wherein the second sub-prefix command indicates to perform an NXOR operation on the n groups of page data, and the peripheral circuit is further configured to:
perform the NXOR operation on the n groups of page data according to the second sub-prefix command to generate the (n+1)th group of page data; and
write a m-th group of page data into the memory cell array, so as to store m bits of information in the memory cells, wherein the m-th group of page data is a sequence of all 0s or a sequence of all 1s.

18. The memory of claim 13, wherein, when the difference between m and n is 3, the prefix command includes a third sub-prefix command, wherein the third sub-prefix command indicates that the (n+1)th group of page data is equal to an n-th group of page data, and the peripheral circuit is further configured to:
perform a copy operation on the n groups of page data according to the third sub-prefix command to generate the (n+1)th group of page data; and
write a (n+2)th group of page data and a m-th group of page data into the memory cell array to store m bits of information in the memory cells, wherein the (n+2)th group of page data and the m-th group of page data are a sequence of all 0s or a sequence of all 1s.

19. The memory of claim 13, wherein the peripheral circuit is further configured to:
before determining the (n+1)th group of page data, determine whether the prefix command is received, and generate a determination result; and
determine the (n+1)th group of page data according to the received prefix command and the n groups of page data when the determination result indicates that the prefix command is received.

20. The operation method of claim 1, wherein the function of the memory is based on a write speed.

* * * * *